Dec. 1, 1953 E. W. BAILY 2,661,244
MEANS FOR ADDING SOLID MATERIALS TO LIQUID
Filed June 7, 1949 4 Sheets-Sheet 3
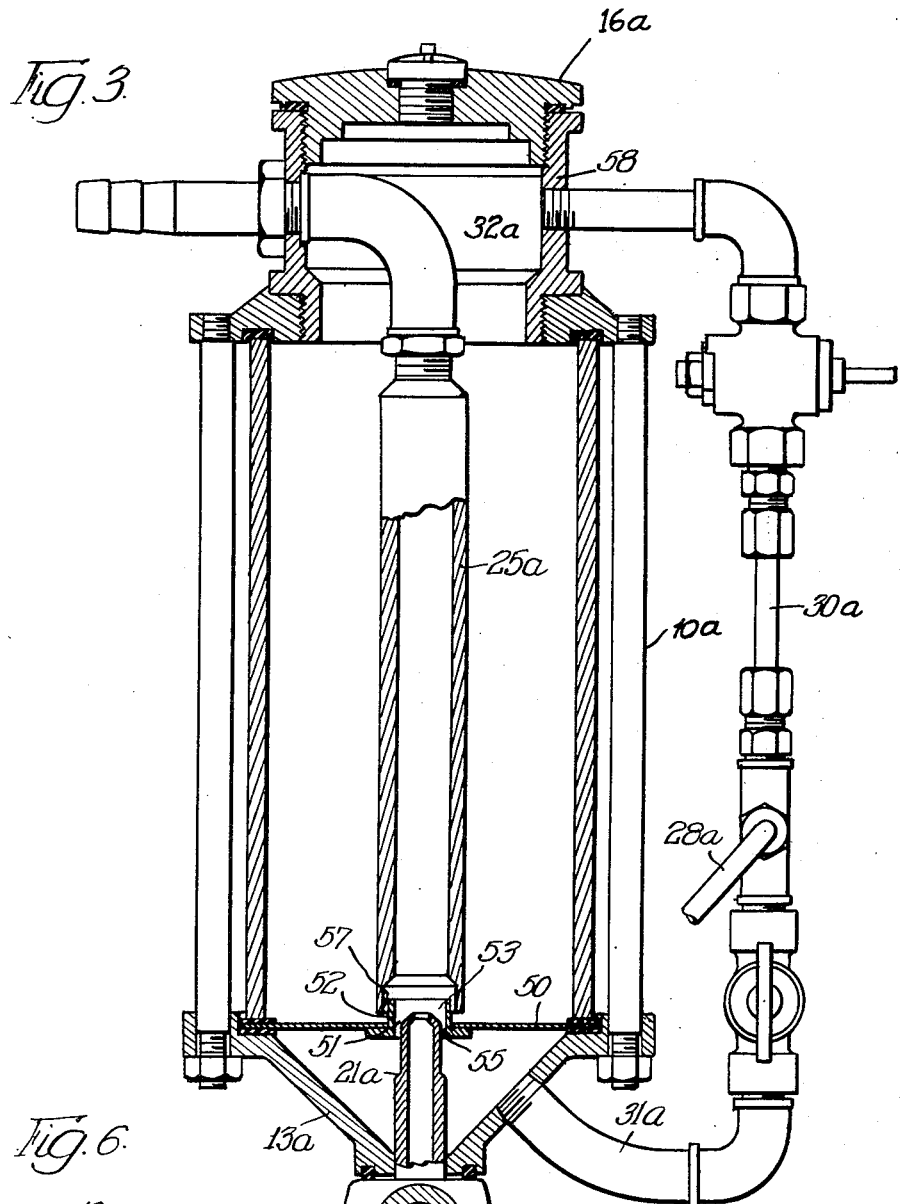
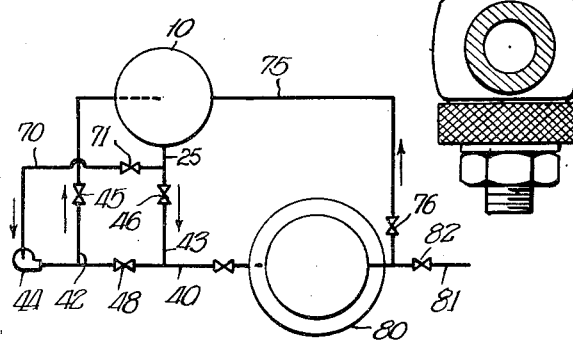
INVENTOR.
Edgar W. Baily,
BY
agent.

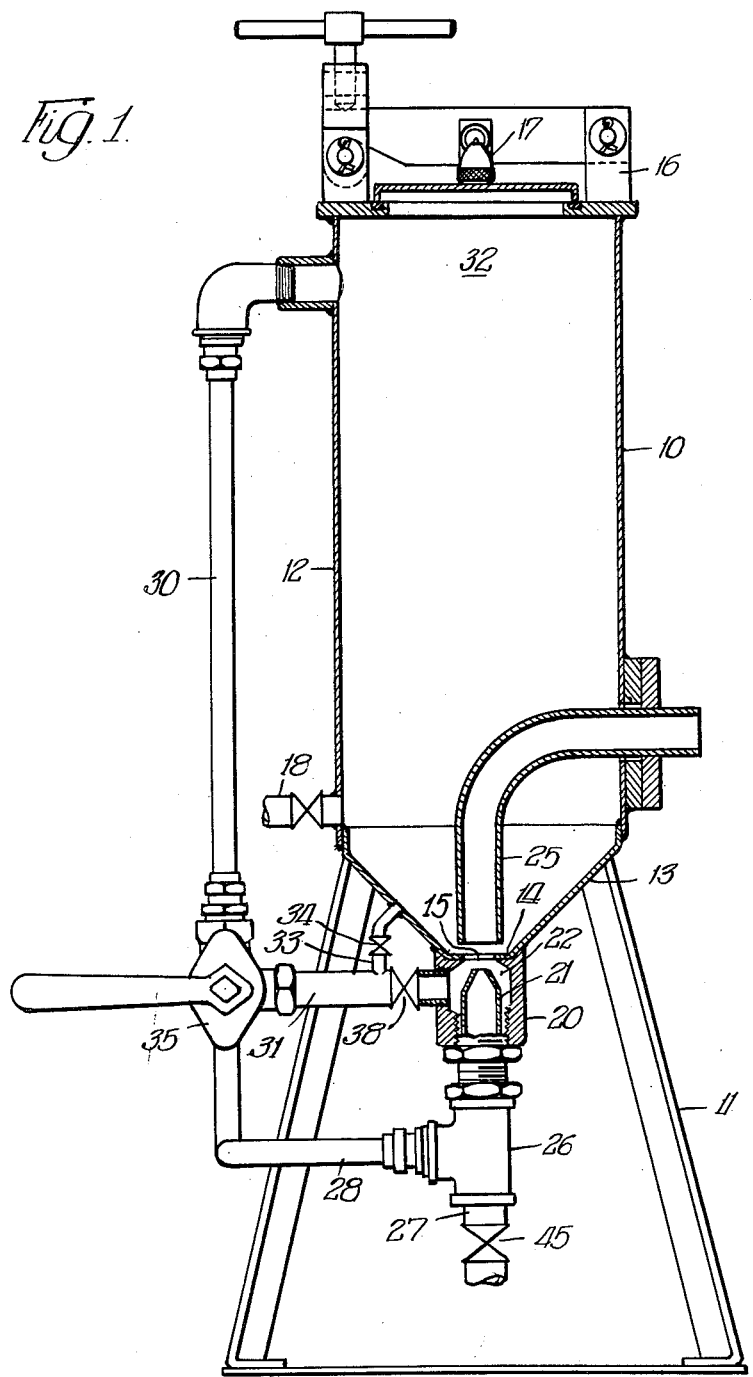

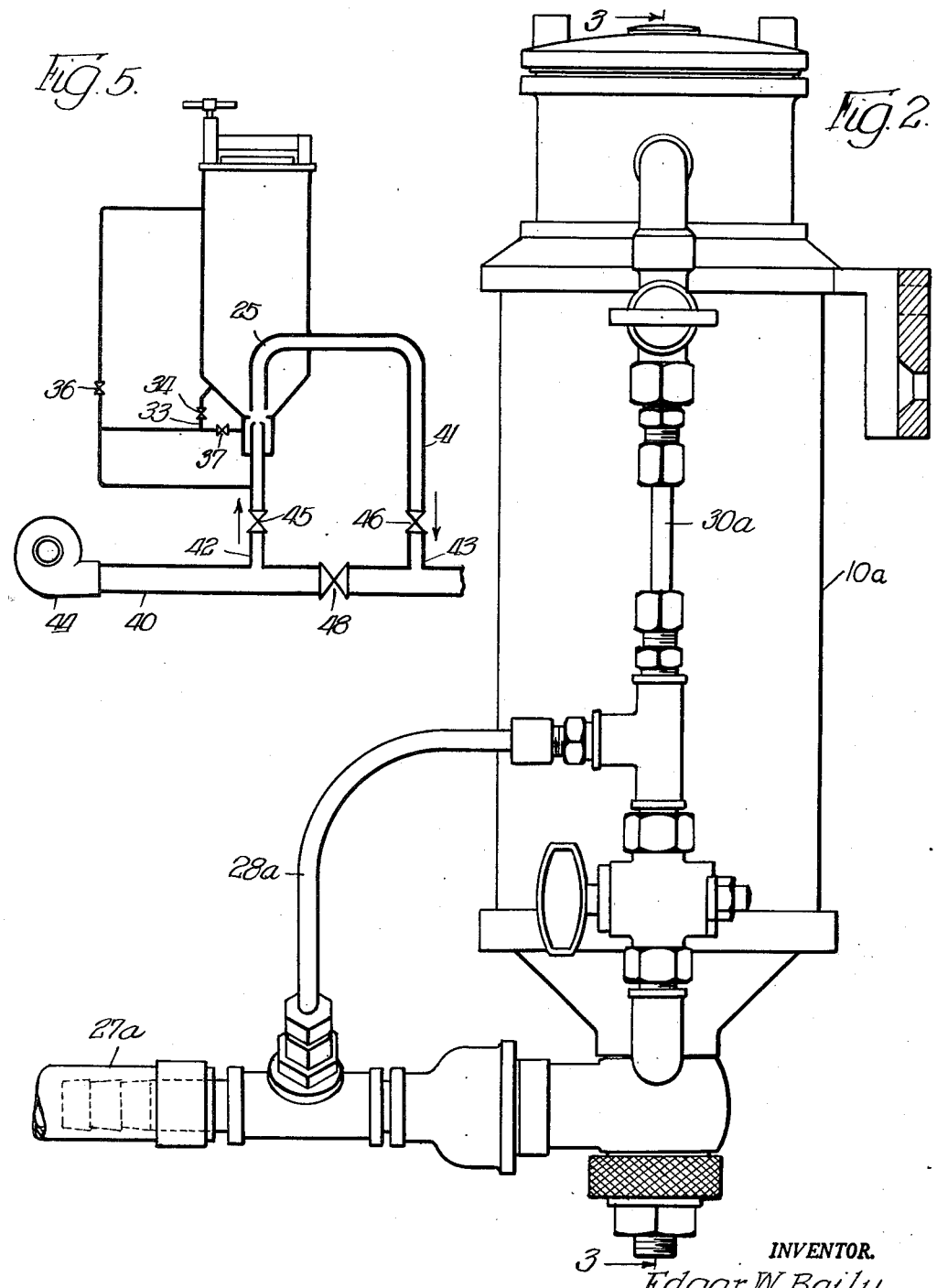

Dec. 1, 1953 E. W. BAILY 2,661,244
MEANS FOR ADDING SOLID MATERIALS TO LIQUID
Filed June 7, 1949 4 Sheets-Sheet 4

INVENTOR.
Edgar W. Baily,
BY
Agent.

Patented Dec. 1, 1953

2,661,244

UNITED STATES PATENT OFFICE 2,661,244

MEANS FOR ADDING SOLID MATERIALS TO LIQUID

Edgar William Baily, Purley, England, assignor to The Paterson Engineering Company, Limited, Kingsway, England, a corporation of Great Britain Application June 7, 1949, Serial No. 97,658

Claims priority, application Great Britain June 16, 1948

8 Claims. (Cl. 302—15)

This invention relates to means for the addition of insoluble or granular solids to liquids.

It is an object of this invention to provide simple and effective means for feeding solid material to a liquid.

A particular object of the invention is the regulated proportional addition of particulate solid material to a flowing liquid, whether under pressure or not.

Another object of the invention is to provide an apparatus which utilizes a controlled portion of a flowing liquid to eject a suitable quantity of solid material and feed it to the flowing liquid.

Another object is to provide a filter aid feeder which delivers filter aid material in predetermined proportion to the flow of liquid to be filtered without necessitating the use of mechanically operated stirring means and the like.

Another object of the invention is to provide a hydraulically operable feeder for solid material.

Another object is a feeder for solid particulate material which automatically dilutes the material to a suspension of light density thereby preventing formation of deposits in the pipes through which the material flows.

These and other objects of the invention will become apparent upon consideration of the description and the claims which follow.

A principal sphere of usefulness of this invention is in connection with liquid filtration apparatus of the kind wherein the liquid is filtered by being passed through a layer or coat of filter aid material, such as for example diatomaceous earth, deposited on a suitable support. Therefore, the invention will be described for purposes of exemplification and illustration as applied to feeding filter aid material to such a filter. It should be understood, however, that the invention is not limited to this specific application, but is useful wherever it is desired to secure a regulated addition, and especially a proportional addition, of a particulate solid material to a flowing liquid.

It is well known in connection with filtration apparatus of the type mentioned that after the filter aid coat or bed has been formed on the support, the addition of a small quantity of the particulate filter medium to the liquid under treatment prolongs the filter run as the deposition of additional particles on the filtering surface maintains its porosity and permits continued flow of liquid therethrough without impairing the purity of the filtrate. This is often of such importance that filtration would be impracticable or costly in operation without the addition of filter aid during filtering.

Heretofore it has been usual to effect spasmodic addition of these small quantities of filter aid. Filter aid can of course be added in correct proportion to the bulk liquid where it is permissible to deal with a batch quantity at one time, but this is inconvenient when dealing with large quantities and where the liquid is supplied under pressure or where the pump is remote from the filter necessitating a long pipe line. Therefore, sometimes attempts were made to secure regulated proportional addition. Usually, this was done by depositing a slurry composed of filter aid material and liquid in a suitable vessel equipped with a mechanical device, such as a stirrer, to keep the slurry in continuous agitation prior to its injection into the suction of the pump delivering the liquid to be treated to the filter or of a separate pump. My new filter aid feeder provides continuous regulated proportional addition of filter aid material but avoids mechanical devices and relies on hydraulic means, preferably operated by the flowing liquid.

Briefly, in its preferred form the new apparatus comprises a closed vessel or container in which a quantity of the solid material is deposited, an ejector operated by the flowing liquid and associated with the container in such a manner that the liquid entrains a proportional quantity of the solid material and discharges it into the filter or other situation where it may be required. The apparatus also includes simple means for regulating the quantity of solid material entrained by the ejector.

The invention will be more readily understood from a consideration of the drawings wherein Figure 1 is a sectional elevation of one form of the apparatus;

Figure 2 is a front view, partly in section, of a modification of the apparatus of Figure 1;

Figure 3 is a section through the apparatus of Figure 2, taken along the line 3—3 of Figure 2;

Figure 5 is a flow diagram showing the apparatus connected to the inlet line of a filter; and Figure 6 is a flow diagram showing the apparatus connected for precoating.

Figure 4:
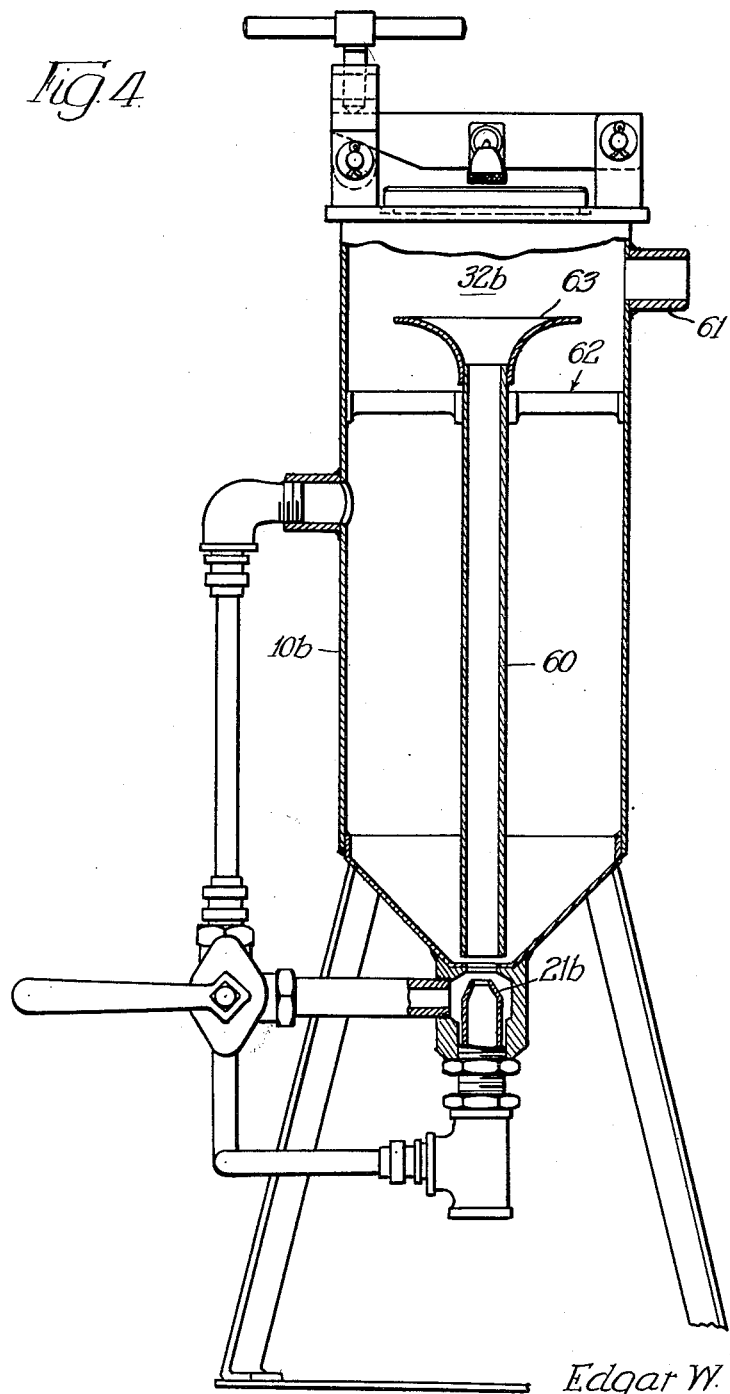
Figure 4 is a sectional elevation of another modification of the apparatus.

The feeder shown in Figure 1 comprises a container or vessel 10 which may be supported by any suitable means, such as legs 11. The container 10 has a cylindrical side wall 12 and preferably has a conical base or hopper bottom 13 whose bottom portion 14 has an opening 15. The container 10 is provided with a removable cover or lid 16 which may be hinged or otherwise fastened to the container 10 in any suitable manner to provide a liquid tight seal for the container. An air release valve 17 is provided in the cover 16 and a valved drain 18 leads from a lower portion of the container.

The opening 15 is surrounded by an annular inlet fitting 20 as shown. The lower end of the inlet fitting 20 is threaded to receive a convergent jet tube 21 which forms part of an ejector. Between the upper end of the jet tube 21 and the bore of the inlet fitting 20 an annular chamber 22 is formed. The discharge end of the ejector tube 21 is positioned just below the opening 15 in the bottom 14 and discharges therethrough.

A pipe 25 has its inlet end directly opposite the jet tube and spaced above the opening 15 in the conical base 13. The pipe 25 extends upwardly and through the side wall 12 of the container and forms the outlet part of the ejector. The lower end of the ejector tube 21 is screwed into a T connection 26, the opposite end of which is connected to a liquid inlet conduit 27 through which liquid under pressure is admitted to the ejector. The leg of the T 26 is connected by a connection 28 to a conduit extending upwardly outside the container and discharging into water space 32 in the upper portion of the container 10, as shown. A by-pass conduit 31 leads from the conduit 30 through the inlet fitting 20 and discharges into the annular chamber 22 surrounding the ejector tube 21. Flow through the conduit 30 and the by-pass 31 is controlled by a three-way valve 35. In the preferred form the valve 35 has an inlet on its axis and a single port which begins to open to conduit 30 as it begins to close to by-pass 31 and vice versa. This facilitates the control, the amount of solid material ejected varying with the position of the valve. The valve can be fitted with a scale and pointer to enable the same setting to be readily repeated. Obviously, and as shown in Figure 5, two separate valves, 36 and 37, may be used on conduits 30 and 31 instead of the three-way valve 35.

A conduit 33 provided with a suitable valve 34 is shown discharging into the lower part of the container 10. The conduit 33 may lead from any suitable point upstream of the inlet fitting 20 but preferably is branched off the by-pass conduit 31. With this construction a valve 38 must be provided on the by-pass 31 downstream of the conduit 33, or, if separate valves 36 and 37 are used, then valve 37 will be downstream of conduit 33.

It will be understood that usually, but not necessarily, the apparatus is operated by the flowing liquid, a proportion of the liquid being delivered to the filter, or in some cases all of the liquid, whether pumped or otherwise supplied under pressure, being diverted to the ejector through the inlet conduit 27. The method of connecting the apparatus to the filter supply line 40 will vary according to the nature of the liquid to be filtered and the amount of filter aid required. When a relatively small addition of filter aid is required the apparatus may be connected in a shunt or by-pass circuit across the main filter supply pipe.

When the nature of the liquid requires a greater quantity of filter aid all the liquid may be passed through the jet before filtration. This may be done by closing of the valve 48 on the main to the filter, or by extending the main through the apparatus, the conduit 25 being connected to the filter inlet. The apparatus need not be operated by the flowing liquid to be dosed but can be provided with operating liquid from any suitable independent source of liquid under pressure.

A preferred method of connecting the apparatus to the filter supply line is shown in Figure 5. The shunt or by-pass line 41 includes the inlet conduit 27, ejector tube 21 and outlet pipe 25, and is branched off the main filter inlet conduit 40 at 42 and discharges to the conduit 40 at 43 downstream of point 42. If the liquid is pumped to the filter, the point 42 is downstream of the pump 44. Valves 45 and 46 are provided in the line 41 as shown. By closing of the valves 45 and 46 the container can be isolated from the main conduit 40. Intermediate the points 42 and 43 a flow restricting device 48, such as a valve, or an orifice plate, (not shown), is provided in the main conduit to create a restriction therein, so as to cause a proportion of the flow to pass through the by-pass lne 41 when valves 45 and 46 are open.

The operation of the apparatus will be readily understood. Before the operation is started, valves 45 and 46 on the line 41 are closed. The container 10 is then filled approximately half full of liquid, then the solid granular material is added until the container is nearly full. Obviously, the container can also first be about half filled with the material and then the water added; however, I have found that putting the solid material into liquid at the commencement increases the capacity of the apparatus, as usually wetted solid materials occupy less space than dry ones. After the container 10 has been filled and closed, valves 45 and 46 are opened and liquid under supply pressure issues as a jet from the ejector tube 21 creating a reduction of pressure at the annular opening 15, whereby a proportion of the filter aid material is entrained into, and discharged through, the pipe 25. The filter aid material taken in at the ejector is immediately diluted with a relatively large quantity of liquid whereby a suspension of light density is produced which passes through the pipes leading to the filter without difficulty and with sufficient velocity to prevent formation of deposits of filter material in the pipes.

If the reduction in pressure adjacent the ejector were allowed to reduce the pressure in the container 10, a state would be reached where the flow would cease. To restore the pressure in the container as filter aid material is entrained and withdrawn therefrom, a portion of liquid is diverted from a point upstream of the jet outlet to the upper portion of the container. This liquid may be taken directly from the main, if desired, or from any upstream point of the jet outlet. Preferably, and as shown in the figure, the conduit 28—30 through which the liquid is diverted leads from the inlet T 26 to the water space 32 in the upper portion of the container 10. The amount of liquid entering the container 10 through conduit 30 can be regulated by proper setting of the valve 36 (Figure 5) or of three-way valve 35 (Figure 1). Opening of valve 36, or of the corresponding port of three-way valve 35, to admit a greater volume of liquid to the upper portion of the container 10 increases the feed rate of the feeder by increasing the pressure in the container.

In order to obtain a closer regulation of the volume of the particulate material entrained by the jet from the ejector tube 21, a portion of the supply to the jet can be by-passed through the by-pass conduit 31 to the annular space 22 surrounding the jet tube, whereby the demand of the ejector can be partly satisfied and the tendency of the jet to entrain filter aid material be reduced. The amount of liquid by-passed in this manner is controlled by setting of the valve 37 (Figure 5) or of three-way valve 35 (Figure 1). Opening of valve 37, or of the corresponding port of the three-way valve 35, to admit more liquid to the by-pass 31, decreases the feed rate by partially satisfying the demand of the ejector.

When valve 34 is opened and valve 38 on the by-pass is closed, the liquid entering the by-pass 31 through the three-way valve 35 is deflected through the conduit 33 into the lower part of the container. Liquid discharging through conduit 33 serves to agitate the material around the jet outlet and is conducive to increasing the feed rate. Conduit 33 is useful especially where the material has a tendency to arch or compact which prevents its being entrained by the jet.

It is thus seen that several controls are provided for adjusting the feed rate of the feeder. The valves 45 and 46 on the shunt line 41 may be set to admit a predetermined volume of liquid to the apparatus. The three-way valve 35 (or the individual valves 36 and 37) may be used to admit desired proportions of flow to the water space 32 at the top of the container through conduit 30 or through the by-pass conduit 31 to the chamber 22. It will be understood that the liquid discharged into the water space 32 through conduit 30 and liquid discharged into chamber 22 through by-pass 31 counteract each other, the former increasing and the latter decreasing the feed rate. Similarly, liquid admitted to the lower part of the container through conduit 33 has the contrary effect of liquid discharged through by-pass 31 into chamber 22. By properly setting the several valves a very accurate control of the rate of feed can be obtained. These valves may be manually or automatically operated, as is well known in the art. Obviously, the by-pass 31 can be omitted and the feed rate adjusted by setting of valves 45, 46 and 36. However, the control is facilitated by the by-pass and particularly so, when using a three-way valve as described. Similarly, conduit 33 can and will in many cases be omitted.

The volume of flow through the container is also regulated by the flow restricting device 48 on the main 40.

The apparatus shown in Figures 2 and 3 is essentially the same as that of Figure 1. However, in this embodiment, a diaphragm 50 is provided across the conical base 13a of the container 10a. The diaphragm 50 has a central opening 51. An annular wall 52 surrounds the opening 51 and forms an annular chamber 53 as shown. The ejector 21a extends through the conical chamber 13a into the annular chamber 53 into which it discharges. A narrow passageway 55 is left between the ejector tube 13a and the annular wall 52. The lower end of the outlet pipe 25a surrounds the upper part of the annular wall 52 and is spaced above the diaphragm 50, leaving an inlet passage 57 for the material to be entrained by the liquid jet. In this embodiment, the outlet pipe 25a is shown for exemplification as extending in the container 10a to its top and through a boss 58 which surrounds the open end of the container 10a, as shown. The cap or lid 16a is screwed into the boss 58. The pressure connection 30a from the inlet conduit 27a to the top portion of the container is shown in this embodiment also as discharging through the boss 58 into the water space 32a of the container. Obviously, pipes 25a and 30a could discharge in the manner shown in Figure 1 and vice versa, the corresponding pipes of Figure 1 could discharge in the manner shown in Figures 2 and 3. The by-pass conduit 31a in this embodiment discharges below the diaphragm 50 to avoid disturbance of the filter aid material in the container; the liquid discharged from the conduit 31a passing into the annular chamber 53 through the passageway 55.

If desired, the hopper bottom 13a may be dispensed with and a flat bottom be used instead of the diaphragm. With such a construction the bottom part of the passageway 55 can be closed and the by-pass 31a can discharge directly into the annular chamber 53 in the same manner as shown in Figure 1.

The operation of this embodiment is the same as that of Figure 1, so that it need not be described.

The apparatus shown in Figure 4 is also quite similar to the apparatus of Figure 1. However, in this embodiment of the invention, the pipe 60 which receives the discharge of the ejector tube 21b discharges inside the container 10b into the water space 32b above the upper surface of the solid material therein. The space 32b becomes filled with a dilute mixture of liquid and solid material. The material is withdrawn through a pipe connection 61 on the side of the container which may be connected to the main 40. The pipe 60 is held in position by a support 62 across the container. If desired, the pipe 60 may be made divergent and have a bell mouthed upper opening and deflector plate 63, as shown, to ensure a quiet discharge into the water space and thus avoid turbulence being transmitted to the surface of the solid material. The baffle 63 may be made removable to facilitate loading the material into the container. The operation of this embodiment is the same as that described in connection with Figure 1.

The apparatus as described can conveniently be applied in forming the filtering layer at the commencement of a run by filling the requisite quantity of precoat into the container 10 with some of the liquid to be filtered and connecting the outlet 25 to the suction of the liquid pump which circulates it through the filter and container until the filter bed is formed. When the delivery of clarified liquid indicates that the bed is formed the container is isolated by suitable valves, circulation being maintained in the pipes. The container can subsequently be filled with particulate material and used to supply filter aid in the manner described.

The necessary connections for this operation are shown in Figure 6. A pipe 70 provided with a valve 71 connects the outlet pipe 25 upstream of valve 46 to the suction side of the pump 44. A pipe 75 provided with a valve 76 leads from the filter outlet conduit 81, upstream of the filter outlet valve 82 to the container 10. During precoating, valves 45 and 46 are closed and valves 71 and 76 are open, the filter outlet valve being closed. The liquid is then circulated through main 40 to and through the filter 80, through line 75 to container 10 and through pipe 25 and line 70 to the suction side of the pump 44. When the filter bed has been formed, valves 76 and 71 are closed and the filter outlet valve 82 is opened, valves 45 and 46 remaining closed during filling of the container.

Alternatively the filtering layer or bed can in many instances be formed directly with the apparatus in use in its normal manner if a valve 48 is fitted on the main supply pipe 40 between the two connections 42 and 43. By throttling or closing the valve 48 a greater flow can be diverted through the ejector for a few seconds or minutes, as may be required, increasing the ejection of the filter aid from the vessel during this period. When sufficient material has been taken from the container 10 to form the filtering layer the valve 48 is opened to its normal position and the adjustments of the filter aid feeder set for normal filtering with filter aid being added in the required small quantity. Where the flow restricting element 48 is an orifice plate it is also possible to obtain the necessary volume of flow for precoating by closing the valve 35 to the by-pass 31 and fully opening it to the conduit 30.

It will be understood that while the invention has been described specifically in its relation to liquid filtration plant it is equally applicable in any situation where it is desired to effect the regulated addition of any insoluble or granular material to a flowing liquid.

The invention is not restricted to a closed vessel although that is its most useful form. It can however be applied to an open vessel if means to maintain a constant level of water in the vessel are provided. Such means are well known in the art and need not be described. While the ejector has been shown as being in a vertical position in some cases it may be more convenient to use it horizontally.

I claim:

1. Apparatus for proportional feeding of a wetted solid filter aid material to a stream of liquid to be filtered comprising a container for holding a supply of the wetted material, and means operative to withdraw an amount of wetted material proportional to said stream of liquid and feed it to said stream as a suspension in liquid, said means including pipe means having an inlet in said container spaced above the bottom thereof, and an outlet portion passing through a wall of said container and, when installed in operative position, connected to said stream of liquid, an ejector tube having a jet outlet discharging into said container in the direction of said inlet of said pipe means, said ejector tube, when installed in operative position, being connected with its inlet to said stream of liquid upstream of said outlet portion, an annular wall forming a chamber about said jet outlet, a conduit leading from said ejector tube upstream of said jet outlet and discharging to the upper portion of said container, conduit means for diverting a portion of the liquid flowing through said conduit to said chamber, and valve means regulating the quantity of liquid diverted to said chamber.

2. Apparatus according to claim 1 comprising also a conduit adapted to discharge liquid under ejector inlet pressure into the lower material holding part of said container at an elevation substantially spaced above the elevation of the inlet of said pipe means.

3. Apparatus for proportional feeding of a wetted solid filter aid material to a stream of flowing liquid comprising a container having a bottom including an apertured portion and a top inlet for the solid material and the liquid for wetting it, a shunt conduit passing into said container through said apertured portion and out of said container at a higher elevation, said shunt conduit being connected to said flowing liquid with its inlet and its outlet, and having an annular break adjacent said apertured portion forming a jet outlet, an annular wall forming a chamber about said jet outlet, a pressure connection from said shunt conduit upstream of said break to the upper portion of said container for admitting liquid from said shunt conduit to said upper portion of said container, and means for diverting a portion of the pressure liquid from said pressure connection to said chamber.

4. A hydraulically operated filter aid feeder for feeding proportional amounts of wetted filter aid to a filter comprising a filter aid material holding container having an opening through which the filter aid and water can be introduced, removable closure means for said opening, a shunt conduit entering said container through its bottom and extending to outside said container at a higher elevation, the inlet portion of said shunt conduit being connected to the flow of liquid under pressure to the filter, and the outlet end of said shunt circuit being connected to the liquid flow to the filter downstream of said inlet end, said shunt conduit having an annular break, the conduit at said break being shaped to form a jet outlet discharging into the lower portion of said container and an intake for the discharge of said jet outlet above said bottom, a wall forming a chamber about said jet outlet, a connection from the inlet portion of said shunt conduit into the upper portion of said container, a by-pass from said connection to said chamber, a branch conduit leading from said by-pass to the lower part of said container, and means for regulating flow through said shunt conduit, said connection, said by-pass and said branch conduit.

5. Apparatus for proportional feeding of wetted solid filter aid material to a liquid to be filtered comprising a container for the material to be fed, ejector means having an inlet connected to said liquid to be filtered and including a jet outlet discharging in the bottom portion of said container, and an outlet pipe being in open communication with the lower portion of said container and receiving the discharge of said jet outlet, said outlet pipe leading through a wall of said container and having an outlet connected to said liquid to be filtered, wall means forming a chamber around said jet outlet, connections from a part of said ejector means upstream of said jet outlet to an upper portion of said container and to said chamber, and valve means regulating flow through said connections.

6. Apparatus for proportional addition of particulate material to a liquid flowing through a main comprising a material holding container having an upright side wall and a hopper bottom, a diaphragm across said hopper bottom, a passageway through said diaphragm, an annular wall surrounding said passageway, an ejector associated with said container, said ejector including an ejector tube extending upwardly through said hopper bottom and having a jet outlet discharging into the space within said annular wall, and an outlet tube having an inlet positioned above said annular wall and extending upwardly therefrom and through said side wall, the inlet and outlet of said ejector being connected to said main, a flow restricting element on said main interposed between said inlet and outlet connections of said ejector, a pressure conduit from an inlet portion of said ejector to an upper portion of said container, a by-pass from said pressure conduit discharging below said diaphragm, and flow regulating means associated with said pressure connection and said by-pass.

7. Apparatus for proportional feeding of wetted solid filter aid material to a stream of liquid comprising a container for holding a supply of wetted filter aid material, and means operative to withdraw an amount of such wetted material proportional to said stream of liquid and feed it to said stream as a suspension in liquid, said means including a shunt circuit leading through said container, both ends of said shunt circuit being connected to said stream of liquid, said shunt circuit including an ejector tube having a jet nozzle, and a conduit receiving the discharge of said jet nozzle and being in open communication with the lower part of said container, wall means forming a chamber surrounding said jet nozzle, conduit means connecting a portion of said shunt circuit upstream of said container to said chamber and to the upper portion of said container, and valve means on said conduit means regulating flow to said chamber and to said upper portion of said container.

8. Apparatus for proportional feeding of wetted solid filter aid material to a flowing stream of liquid comprising a container for the material to be fed, said container having an inlet through its bottom and a top inlet for the solid material and liquid for wetting it, a shunt circuit passing through said container and having an inlet and an outlet connected to said flowing stream of liquid, said shunt circuit including an ejector tube having a jet outlet adjacent said bottom inlet, a pipe having a lower end portion positioned to receive the discharge of said jet outlet, said pipe extending to an upper elevation in said container, a baffle surrounding the upper end of said pipe and shaped to deflect the material discharged from said pipe upwardly, and outlet means from said container for the material to be fed leading from an elevation above the upper end of said pipe, an annular wall forming a chamber around said jet outlet, a pressure connection from said shunt circuit upstream of said jet outlet to a portion of said container above said lower end portion but below the upper end of said pipe, and means for diverting a portion of liquid from said pressure connection to said chamber.

EDGAR WILLIAM BAILY.

References Cited in the file of this patent

UNITED STATES PATENTS

| Number | Name | Date |
|---|---|---|
| 423,773 | Jewell | Mar. 18, 1890 |
| 560,764 | Taylor | May 26, 1896 |
| 595,120 | Dehn | Dec. 7, 1897 |
| 1,193,038 | Mann | Aug. 21, 1916 |
| 1,339,977 | Pruden | May 11, 1920 |
| 1,409,248 | Sevcik | Mar. 14, 1922 |
| 1,535,991 | Crom | Apr. 28, 1925 |
| 1,654,406 | Bonner | Dec. 27, 1927 |
| 1,861,295 | Bramwell | May 31, 1931 |
| 1,912,334 | Peet | May 30, 1933 |
| 2,216,921 | Marvel | Oct. 8, 1940 |
| 2,462,886 | Morrow | Mar. 1, 1949 |
| 2,486,650 | Hepp | Nov. 1, 1949 |